United States Patent [19]

Gonczy et al.

[11] Patent Number: 4,608,215
[45] Date of Patent: Aug. 26, 1986

[54] PREPARATION OF CERAMICS

[75] Inventors: Stephen T. Gonczy, Mount Prospect; Randy J. Lawson, Arlington Heights; Bruce I. Rosen, Skokie, all of Ill.

[73] Assignee: Allied Corporation, Morristown, N.J.

[21] Appl. No.: 565,077

[22] Filed: Dec. 23, 1983

[51] Int. Cl.$^4$ ............................................. C04B 35/14
[52] U.S. Cl. ..................................... 264/56; 423/331; 264/61; 501/12; 501/109; 501/121; 501/122
[58] Field of Search .................... 264/61, 56; 501/109, 501/121, 122, 12; 252/320; 423/331

[56] References Cited

U.S. PATENT DOCUMENTS

| | | | |
|---|---|---|---|
| 3,811,899 | 5/1974 | Stibbs | 501/109 |
| 3,971,665 | 7/1976 | Suzuki et al. | 501/109 |
| 3,979,215 | 9/1976 | Emblem | 501/109 |
| 4,278,632 | 7/1981 | Yoldas | 264/61 |

OTHER PUBLICATIONS

Singer et al., Industrial Ceramics, Chapman and Hall, London, 1963, pp. 425, 1201–1204, 1222–1225.

Primary Examiner—James Derrington
Attorney, Agent, or Firm—Thomas K. McBride; John F. Spears, Jr.; Raymond H. Nelson

[57] ABSTRACT

Ceramic materials comprising steatite or forsterite which are highly dense in nature may be prepared by admixing a hydrolyzed alcoholic solution of a silicon alkoxide with a solution prepared by adding an organomagnesium compound to an alcohol at gelation conditions. Following the formation of the gel, it is then dried at an elevated temperature of from about 300° to about 500° C. to remove volatile compounds as well as to decompose any remaining organic compounds and thereafter the powder is pressed into a desired shape. The formed shape is then sintered at a temperature in the range of from about 850° to about 950° C. to form a densified ceramic.

13 Claims, No Drawings

PREPARATION OF CERAMICS

BACKGROUND OF THE INVENTION

Ceramics are widely used for many industrial purposes. For example, ceramics such as steatite are used in the electronic and electrical appliance industries. The ceramics or porcelain can be formed into a great many sizes or shapes and can be used for grommets, bushings, washers, insulators, reostat bases, thermostat parts, etc. In addition, the ceramic may be used as a porcelain coating for metal substrates which are used in thick film ink circuitry. The term "steatite" may be used generically for the various forms thereof such as clinoenstatite, protoenstatite and enstatite. The latter, that is, enstatite, is the stable low-temperature form of steatite which, at a temperature of about 1040° C. converts to protoenstatite, which is the stable high-temperature modification form. If protoenstatite is rapidly cooled to a temperature less than about 850° C., a transformation of the protoenstatite occurs to form clinoenstatite which is the metastable low-temperature form of steatite. Generically speaking, the ceramic body is composed of magnesium silicate. If the magnesium and silicon are present in the ceramic in a mole ratio of 1:1, the compound may be designated as steatite, while if the magnesium and silicon are present in a mole ratio of 2:1 moles of magnesium per mole of silicon, the ceramic may be designated as forsterite.

When utilizing the ceramic as a coating for metal substrates in the electronic circuitry, it is necessary that the ceramic or porcelain possess certain desirable characteristics. The use of most ceramics and porcelains for coating metal substrates is limited by the particular conductive ink which is employed to form the circuitry. Most commonly, the inks which are employed with conventional porcelains are limited to those which require a fairly low temperature, that is, about 600° C. to fire the ink. Additionally, the use of more reliable inks, that is, those which are fired at a temperature of about 850° to 900° C. is prohibited by the softening of conventional insulating porcelains at this firing temperature.

As will hereinafter be shown in greater detail, it has now been discovered that a steatite ceramic may be prepared by utilizing a particular process to obtain a ceramic which may be sintered to a high density ceramic at a relatively low temperature which will not adversely affect the metal substrate of a circuitry board, and will, in addition, permit the use of a reliable ink to form the desired circuitry.

BRIEF SUMMARY OF THE INVENTION

This invention relates to a process for fabricating a ceramic which may be used as an electronic ceramic. More particularly, the invention is concerned with a process for fabricating a homogeneous mixture of silica and magnesia which can be used to obtain a highly dense ceramic body at a relatively low firing or sintering temperature.

When fabricating a device which is used for electronic circuitry, it is desired to obtain a ceramic which will be utilized to coat a metal substrate or board which can be slurried and placed on the metal board for a sintering operation in which the sintering temperature will be low enough to avoid imparting any adverse effect to the metal substrate while at the same time obtaining an impervious closed-porosity ceramic. After obtaining this full density ceramic on the metal substrate, it is then possible to impart a desired circuit on the ceramic by utilizing a conductive ink which is thereafter fired at a temperature in the rang of from about 850° to 900° C. to form the desired circuitry.

By utilizing the ceramic which has been prepared according to the process hereinafter set forth in greater detail, it is possible to obtain a ceramic which, after sintering, will not exhibit a loss of weight, melting or phase change at the ink firing temperatures of interest. The ability to effect the sintering of the powder to full density is also accomplished without the use of a flux material such as those containing alkali metals which impart undesirable properties such as higher dielectric losses to the ceramic.

It is therefore an object of this invention to provide a process for obtaining a homogeneous mixture of silica and magnesia.

A further object of this invention is to prepare a fully dense ceramic body which may be obtained by firing or sintering at a relatively low firing temperature.

In one aspect an embodiment of this invention is found in a process for the preparation of a ceramic which comprises admixing a hydrolyzed alcoholic solution of a silicon alkoxide with an alcoholic solution of an organomagnesium compound at gelation conditions, drying the resultant gel at an elevated temperature to remove volatile compounds, pressing the resultant powder into a desired shape, sintering the powder at sintering conditions to form a densified ceramic, and recovering said ceramic.

A specific embodiment of this invention is found in a process for the preparation of a ceramic which comprises admixing a hydrolyzed methanol solution of silicon methoxide with a methanol solution of magnesium acetate at ambient temperature and atmospheric pressure, drying the resultant gel at a temperature in the range of from about 300° to about 500° C. to remove volatile compounds, pressing the resultant powder into a desired shape, sintering the powder at a temperature in the range of from about 850° to 950° C. to form a densified ceramic and recovering said ceramic.

Other objects and embodiments will be found in the following further detailed description of the invention.

DETAILED DESCRIPTION OF THE INVENTION

As hereinbefore set forth, the present invention is concerned with a process for preparing a ceramic which may be used in the electronics industry such as, for example, a coating for a metal substrate. The material comprising the ceramic which is obtained from the present process will densify to a highly dense condition at relatively low temperatures, that is, at temperatures ranging from about 850° to about 900° C. which is considerably below the conventional sintering temperature which is used to fabricate a ceramic from steatite, said sintering temperature being usually in excess of about 1200° C. The conventional sintering temperature at the latter level will tend to prevent the use of steatite for insulating coatings on metal core boards inasmuch as said temperature usually has a deleterious effect on the metal board, thus the reduced sintering temperature for steatite or forsterite produced according to the process of the present invention renders the composition suitable for use on the metal core boards and, in addition, the sintered ceramic can easily withstand the firing temperatures of around 900° C. which are necessary for thick film inks.

The desired process of the present invention involves a sol-gel technology. A prior method of effecting a sol-gel fabrication of ceramics is based on the use of metal alkoxides in a hydrolysis and condensation reaction to obtain a gel. For purposes of preparing a silica-magnesia sol which is a precursor for steatite or forsterite, a silicon alkoxide is admixed with a magnesium alkoxide. However, commercial magnesium alkoxides such as magnesium methoxide are not soluble to a significant degree in any of the lower alcohols or water which are the usual solvents due to low cost and ready availability.

In the process of the present invention, a gelable sol may be obtained utilizing a wide range of silica-magnesia compositions. In the first instance, a silica alkoxide such as silicon methoxide (tetramethoxy silane), silicon ethoxide (tetraethoxy silane), etc. is placed in a lower alkyl alcohol such as methanol, ethanol, propanol, isopropanol, butanol, sec-butanol, etc., usually in a 1:1 volume ratio. Following this, water is added to the solution to hydrolyze the alkoxide, the amount of water which is utilized for this hydrolysis reaction being in a mole ratio in the range of from about 2:1 to about 5:1 moles of water per mole of alkoxide. After allowing the hydrolysis reaction to proceed for predetermined period of time which may range from about 0.1 up to about 6 hours or more at hydrolysis conditions which will include ambient (20°–25° C.) temperature and atmospheric pressure, the solution is contacted with a second alcoholic solution of a magnesium compound. The mole ratio of magnesium to silicon is adjusted so that the desired form of ceramic is obtained. For example, if steatite is the desired compound, a 1:1 mole ratio of magnesium to silicon is employed. Conversely, if a forsterite type of ceramic is desired, the ratio is altered so that there is a 2:1 mole ratio of magnesium to silicon.

The second component of the sol comprises an alcoholic solution of a magnesium compound and preferably an organomagnesium compound. The alcoholic portion of the solution comprises, as in the case of the alcoholic silicon solution, a lower alkyl alcohol containing from 1 to about 5 carbon atoms such as methanol, ethanol, n-propanol, isopropanol, n-butanol, sec-butanol, n-pentanol, etc. Examples of organomagnesium compounds which may be employed to afford the magnesium portion of the sol will include alkyl magnesium compounds such as dimethylmagnesium, diethylmagnesium, di-n-propylmagnesium, diisopropylmagnesium, di-n-butylmagnesium, di-sec-butylmagnesium, di-t-butylmagnesium, etc; magnesium organic salts such as magnesium formate, magnesium acetate, magnesium propionate, magnesium butyrate, magnesium citrate, etc. It is also contemplated within the scope of this invention that inorganic salts of magnesium such as magnesium nitrate, magnesium dichloride, magnesium sulfate may also be employed although not necessarily with equivalent results. It is to be understood that the aforementioned organomagnesium compounds are only representative of the type of compounds which may be employed in the proces of the present invention and that other organomagnesium compounds may also be used, the only criteria being that the organomagnesium compounds do not precipitate from the particular alcoholic solvent employed in the process. In addition, it is also preferred that when utilizing an alkylmagnesium compound as the magnesium donor for the sol, the magnesium precursor solution be prepared in an inert medium such as nitrogen, argon or helium atmosphere. This preparation of the magnesium solution will be accomplished by adding the organomagnesium compound such as dimethylmagnesium, dibutylmagnesium, etc. in a paraffinic solution such as a hexane, heptane, etc. solution to the alcoholic medium.

After admixture of the alcoholic solution containing the organomagnesium compound and the hydrolyzed alcoholic solution containing the silicon alkoxide, the mixture is allowed to form a gel. The gelation conditions which are employed to attain the desired result will preferably include ambient temperatures (20°–25° C.) and atmospheric pressure, although it is also contemplated within the scope of this invention that elevated temperatures and pressures also may be employed although not necessarily with equivalent results. After permitting the gelation to proceed for a predetermined period of time which may range from about 0.1 up to about 1 hour or more in duration, the gel is then dried by heating to a temperature in the range of from about 300° to about 500° C. whereby any remaining volatiles are driven off as well as decomposing any residual organic compounds.

The resulting powder comprising the ceramic precursor may then be pressed into any desired shape or form or, if so desired, the powder may be slurried and painted or placed on a metal board substrate. The powder is then sintered at a temperature in the range of from about 850° to 950° C., and preferably in a range of from about 850° to 900° C., to form a highly densified ceramic body which may be utilized for any of the purposes hereinbefore set forth. As hereinbefore set forth, the sintering of the powder to form the densified body is accomplished in the absence of any flux. This is of relative importance inasmuch as the metal of the flux which is employed as an aid in the sintering process greatly influences the electrical properties of the ceramic. For example, ceramic bodies with feldspar or other fluxes containing alkali metals are usually only suitable for general low-temperature work, while ceramic bodies which do not contain alkali metals but include alkaline earth metals as the flux material are suitable for only low-losses, higher-frequency work. Therefore, by omitting a flux, it is possible to obtain ceramic bodies which are useful in a wide variety of applications.

While the aforesaid discussion has shown a process for obtaining the highly densified ceramic bodies while employing a batch type operation, it is also contemplated within the scope of this invention that the ceramic bodies may be obtained in a continuous manner of operation. When this type of operation is desired, an alcoholic solution in a hydrolyzed state of the silicon alkoxide and an alcoholic solution of the magnesium alkoxide are continuously charged to an appropriate mixing apparatus wherein the sols are passed through the operation zone under gelation conditions for a period of time sufficient to allow the fabrication of the gel. The resulting gel is continuously withdrawn from the operation zone and passed into a drying zone wherein the gel is subjected to drying conditions at a temperature within a range hereinbefore set forth for a period of time sufficient to remove any volatiles as well as decompose any remaining organic residual compounds. The passage of the gel through the drying zone will be controlled by the drying temperature and, after passage through the zone, the resulting powder which is a precursor to the ceramic is continuously removed. Thereafter, the powder may be treated in a means similar to that hereinbefore set forth, that is, by pressing or molding said powder into the desired shape or form followed by sintering at a temperature in the range of from about 850° to about 900° C. to obtain the desired highly densified ceramic body.

The following examples are given for purposes of illustrating the process for obtaining ceramic bodies which may be sintered at relatively low sintering temperature, thus enabling the same to be utilized with metal substrates and conductive inks without deleteriously effecting the metal substrate. However, it is to be understood that these examples are merely illustrative in nature and that the present process is not necessarily limited thereto.

EXAMPLE I

A ceramic powder was prepared by admixing 27 grams of silicon methoxide (tetramethoxy silane) with 18 cc of methanol. Another solution was prepared consisting of 38.5 grams of magnesium acetate and 48 cc of methanol. Following the addition of 13.2 cc of deionized water to the silicon methoxide solution, the magnesium acetate/methanol mixture was added at room temperature. The mixture was stirred for a period of 5 minutes and after a additional period of 3 minutes the mixed solution gelled. The gel was heated to a temperature of 40° C. for a period of 12 hours, the starting weight of 124.2 grams being reduced to 90.8 grams during this period. A portion of the partially dried gel in an amount of 37.4 grams was heated at temperatures ranging from 120° C. up to a temperature of 500° C., the weight of the gel dropping to 2.00 grams.

EXAMPLE II

Another ceramic powder was prepared by admixing 15.3 grams of silicon methoxide with 4.5 cc of methanol and 7.2 cc of deionized water. Another solution comprising 21.4 grams of magnesium acetate and 30 cc of methanol was prepared and after allowing the first solution to age for a period of 20 minutes, the second solution was added thereto. The solution then was dried at a temperature ranging from 60° to 120° C. for a period of 20 hours following which it was ground with a mortar and pestle to produce a powder. The powder was then further heated at temperatures ranging from 300° to 500° C. for various periods to remove any volatiles and decompose any residual organic compounds.

EXAMPLE III

In this example, a solution of silicon methoxide and methanol in a 1:1 volume ratio was prepared following which water was added to the solution in a 4:1 mole ratio of the silicon methoxide. A second solution comprising 0.65 moles of dibutylmagnesium in a liter of heptane/hexane solvent was added to methanol in a 2:3 volume ratio, the addition of the magnesium in solvent to the methanol being effected under an inert atmosphere of nitrogen. After allowing the silicon methoxide solution to age for a period of 2 hours at room temperature, the solution prepared from dibutylmagnesium and methanol was admixed with the silicon methoxide solution, stirred for a period of 5 minutes and allowed to gel. The resulting gel was then dried at temperatures ranging from about 40° to about 105° C. for an extended period and the resulting solid was ground to form a ceramic precursor powder.

EXAMPLE IV

The powder which was obtained according to the process set forth in Example I above was placed in a die and pressed at a pressure of about 100,000 psi to obtain pellets which were approximately 0.1" thick with a diameter of approximately 0.5". Three pills were produced in this manner. Pill A was that resulting from powder which had been dried and calcined at a temperature of 300° C. Pill B was that derived from powder which had been calcined at 400° C. and pill C was derived from powder which had been calcined at a temperature of 500° C. The three pills were then subjected to sintering temperatures ranging from 700° to 900° C., the sintering at 700° C. being effected for a period of 8 hours; the sintering at 800° C. being effected for a period of 11 hours, and the sintering at 900° C. being effected for a period of 5.5 hours. The results of the sintering are set forth in Table I below:

TABLE I

| | Pill A Sintering Temp. | | | |
|---|---|---|---|---|
| | Start | 700° C. 8 hrs. | 800° C. 11 hrs. | 900° C. 5½ hrs. |
| Diameter (in.) | .510 | .406 | .348 | .331 |
| Thickness (in.) | .104 | .086 | .075 | .072 |
| Weight (g) | .4970 | .2595 | .2497 | .2497 |
| Density (g/cc) | 1.43 | 1.42 | 2.14 | 2.49 |
| Final Density by Immersion = 2.62 g/cc | | | | |

| | Pill B | | | |
|---|---|---|---|---|
| | Start | 700° C. | 800° C. | 900° C. |
| Diameter (in.) | .505 | .475 | .407 | .396 |
| Thickness (in.) | .120 | .115 | .100 | .097 |
| Weight (g) | .5408 | .5085 | .4958 | .4957 |
| Density (g/cc) | 1.37 | 1.52 | 2.33 | 2.53 |
| Final Density by Immersion = 2.73 g/cc | | | | |

| | Pill C | | | |
|---|---|---|---|---|
| | Start | 700° C. | 800° C. | 900° C. |
| Diameter (in.) | .506 | .485 | .412 | .401 |
| Thickness (in.) | .111 | .106 | .092 | .091 |
| Weight (g) | .5280 | .4935 | .4779 | .4801 |
| Density (g/cc) | 1.44 | 1.54 | 2.38 | 2.55 |
| Final Density by Immersion = 2.75 g/cc | | | | |

EXAMPLE V

Another ceramic precursor powder was prepared by forming a solution of 9.6 grams of magnesium acetate hydrate dissolved in 12 cc of methanol and adding this solution to a second solution comprising 6.75 grams of silicon methoxide dissolved in 4.5 cc of methanol and 3.3 grams of deionized water. After stirring the solutions, the resulting mixture was allowed to gel for a period of 5 minutes. The gel was dried for an extended period at temperatures ranging from ambient to 87° C. Following this, the gel was heated to a temperature of 140° C. and ground and sieved to a −200 mesh. Following this, the powder was then further dried at a temperature of 300° C. for a period of 24 hours. As in the preceding example, the powder was placed in a die and subjected to a pressure of 100,000 psi to obtain pellets which were approximately 0.1" thick and had a diameter of approximately 0.5". The pellet or pill was then sintered at temperatures of 700° C. for a period of 8 hours, 800° C. for a period of 11 hours and 900° C. for a period of 5.5 hours. The results of this sintering are set forth in Table II below:

TABLE II

|  | Start | Sintering Temperature | | |
|---|---|---|---|---|
|  |  | 700° C. 8 hrs. | 800° C. 11 hrs. | 900° C. 5½ hrs. |
| Diameter (in.) | .503 | .430 | .381 | .378 |
| Thickness (in.) | .087 | .075 | .067 | .066 |
| Weight (g) | .5060 | .3319 | .3225 | .3225 |
| Density (g/cc) | 1.79 | 1.86 | 2.58 | 2.66 |
| Final Density by Immersion = 2.74 g/cc | | | | |

It is apparent from the results set forth in Tables I and II above that a highly dense ceramic body may be obtained from powders prepared according to the process of the present invention. Inasmuch as a high density was attained at a temperature of 900° C., it is also apparent that these ceramic precursors could be employed for coating metal substrates without imparting any deleterious effect to the metal. In addition, the ceramic coated metal may be employed in a subsequent step wherein an ink is painted on the surface of the ceramic and fired at a temperature up to about 900° C. to provide circuitry which may be subsequently used in an electronic or electric capacity.

We claim as our invention:

1. A process for the preparation of a fully dense ceramic body which comprises admixing a hydrolyzed alcoholic solution of a siilcon alkoxide with an alcoholic solution of an alkyl magnesium compound at gelation conditions, drying the resultant gel at an elevated temperature to remove volatile compounds, pressing the resultant powder into a desired shape, sintering the powder at a temperature of from about 850° to 950° C. to form a densified ceramic, and recovering said ceramic.

2. The process as set forth in claim 1 in which said organomagnesium compound is dipropyl magnesium.

3. The process as set forth in claim 1 in which said organomagnesium compound is dibutyl magnesium.

4. The process as set forth in claim 1 in which the admixing of said silicon alkoxide and said alkyl magnesium compound is effected in an inert atmosphere.

5. The process as set forth in claim 4 in which said inert atmosphere is provided for by the presence of nitrogen.

6. The process as set forth in claim 4 in which said inert atmosphere is provided for by the presence of argon.

7. The process as set forth in claim 1 wherein said gelation conditions include ambient temperatures and atmospheric pressure.

8. The process as set forth in claim 1 wherein said gel is dried at a temperature in the range of from about 300° to about 500° C.

9. The process as set forth in claim 1 wherein said silicon alkoxide is silicon methoxide.

10. The process as set forth in claim 1 wherein said silicon alkoxide is silicon ethoxide.

11. The process as set forth in claim 1 wherein said alcoholic solution comprises a methanol solution.

12. The process as set forth in claim 1 wherein said alcoholic solution comprises an ethanol solution.

13. The process as set forth in claim 1 wherein the mole ratio of magnesium to silicon in the powder is in a range of from 1:1 to about 2:1 moles of magnesium per mole of silicon.

* * * * *